United States Patent [19]

Siddoway et al.

[11] Patent Number: 4,858,798
[45] Date of Patent: Aug. 22, 1989

[54] CARRY CASE WITH QUICK RELEASE AND SELF LOCATING RETAINER APPARATUS

[75] Inventors: Craig F. Siddoway, Ft. Lauderdale; Julio C. Castaneda, Miami; Peter D. Iezzi, Coral Springs, all of Fla.

[73] Assignee: Motorola, Inc., Schaumburg, Ill.

[21] Appl. No.: 161,824

[22] Filed: Feb. 29, 1988

[51] Int. Cl.⁴ ............................................. B65D 25/10
[52] U.S. Cl. .................................... 224/242; 224/240; 224/245; 224/246; 455/90
[58] Field of Search ................ 150/52 R; 455/89, 90, 455/351; 248/311.2, 221.3; 224/253, 242, 245, 226, 225, 235, 175, 253, 252, 232, 240, 197, 250, 251, 246, 922, 202, 208; 24/3 F, 3 G, 3 H, 3 R, 11 P

[56] References Cited

U.S. PATENT DOCUMENTS

| | | | |
|---|---|---|---|
| 3,084,407 | 4/1963 | Settles | 24/3 R |
| 3,631,994 | 1/1972 | Mackzum, Jr. | 224/252 |
| 4,046,295 | 9/1977 | Eichler | 224/5 H |
| 4,083,481 | 4/1978 | Selinko | 24/3 R X |
| 4,299,344 | 11/1981 | Yamashita et al. | 455/351 X |
| 4,420,078 | 12/1983 | Belt et al. | 224/253 X |
| 4,479,596 | 10/1984 | Swanson | 224/236 |
| 4,485,946 | 12/1984 | Llautaud et al. | 224/242 |
| 4,641,370 | 2/1987 | Oyamada | 455/90 X |
| 4,736,877 | 4/1988 | Clark | 224/242 X |
| 4,754,528 | 7/1988 | Lyons et al. | 24/3 R X |
| 4,761,823 | 8/1988 | Fier | 455/90 X |
| 4,775,083 | 10/1988 | Burger et al. | 224/253 |
| 4,801,059 | 1/1989 | Hayes | 224/240 |

Primary Examiner—Harvey C. Hornsby
Assistant Examiner—K. O'Leary
Attorney, Agent, or Firm—Donald B. Southard; Anthony J. Sarli, Jr.

[57] ABSTRACT

A carry case for a portable hand held appliance such as a radio unit is disclosed which is constructed of a soft resilient shock absorbing material and includes a retainer bracket of semirigid material affixed to the interior back wall of the case. This bracket includes a self locating means for centering the portable appliance within the case and a latch means spring biased to locate and retain the portable appliance within the carry case. The radio may be removed by a user's hand contacting an upwardly extending flange to clear the latch means and permit the radio to be removed from the case.

7 Claims, 2 Drawing Sheets

CARRY CASE WITH QUICK RELEASE AND SELF LOCATING RETAINER APPARATUS

BACKGROUND OF THE INVENTION

This invention relates in general to carry cases especially suited for hand-held portable radio apparatus and, more particularly, to such a carry case that includes a quick release retainer device that self locates the inserted radio unit.

Small, hand-held, portable apparatus or appliances, such as two-way radio communication devices with transmitter and receiver units, are, of course known in the art and have been in use for a considerable number of years. These portable devices are utilized and normally operated by holding in one hand while talking and listening. When not in use, they may be retained in a separate carry case supported in the same fashion on the user's person.

Carry cases in the past have, for the most part, prevented use of the radio apparatus while in the case. Those that do permit use nevertheless have other objectionable features, such as being fabricated of a hard, rigid plastic material or are difficult in terms of insertion and removal of the radio unit. That is, they require both hands of the user to manipulate the retention feature and removal of the radio unit. Those cases constructed of the hard plastic are susceptible to damage by impact and are, in many cases rather uncomfortable to the user in pressing into the user's body with sharp edges and the like. Moreover, many of the carry cases in the prior art may well fail to keep the portable apparatus in the case when the user bends over or otherwise causes the carrying case and radio to deviate substantially from the vertical.

SUMMARY OF THE INVENTION

Accordingly, it is an object of the present invention to provide an improved carry case for a portable hand-held device which overcomes the foregoing deficiencies.

A more particular object of the present invention is to provide a carry case of the foregoing type which may be fabricated of a soft, resilient, shock absorbing material which includes a self-locating retainer latch for the portable unit that has a quick release feature that may be operated with one hand.

In practicing the invention the carry case for a portable radio device is provided, which case has been constructed of a soft, resilient, shock-absorbent material, such as leather or the like. A retainer bracket is affixed to the interior backwall of the case and includes a latch which is spring biased to locate over a protuberance positioned on the back vertical wall of the portable appliance. This latch has a selflocating feature that automatically centers the portable radio upon insertion in the carry case. The latch also includes a curved tongue portion extending above the top edge of the case which is movable by a user's hand for a quick release action when a portable radio is being removed from the carry case. Further, all controls are accessible and the portable radio is fully operable while retained within the carry case itself.

BRIEF DESCRIPTION OF THE DRAWINGS

The features of the present invention which are believed to be novel are set forth with particularity in the appended claims. The invention, itself, however, together with further objects and advantages thereof may be best understood by reference to the accompanying drawings, in which:

BRIEF DESCRIPTION OF THE PREFERRED EMBODIMENT

Figures 1, 2:
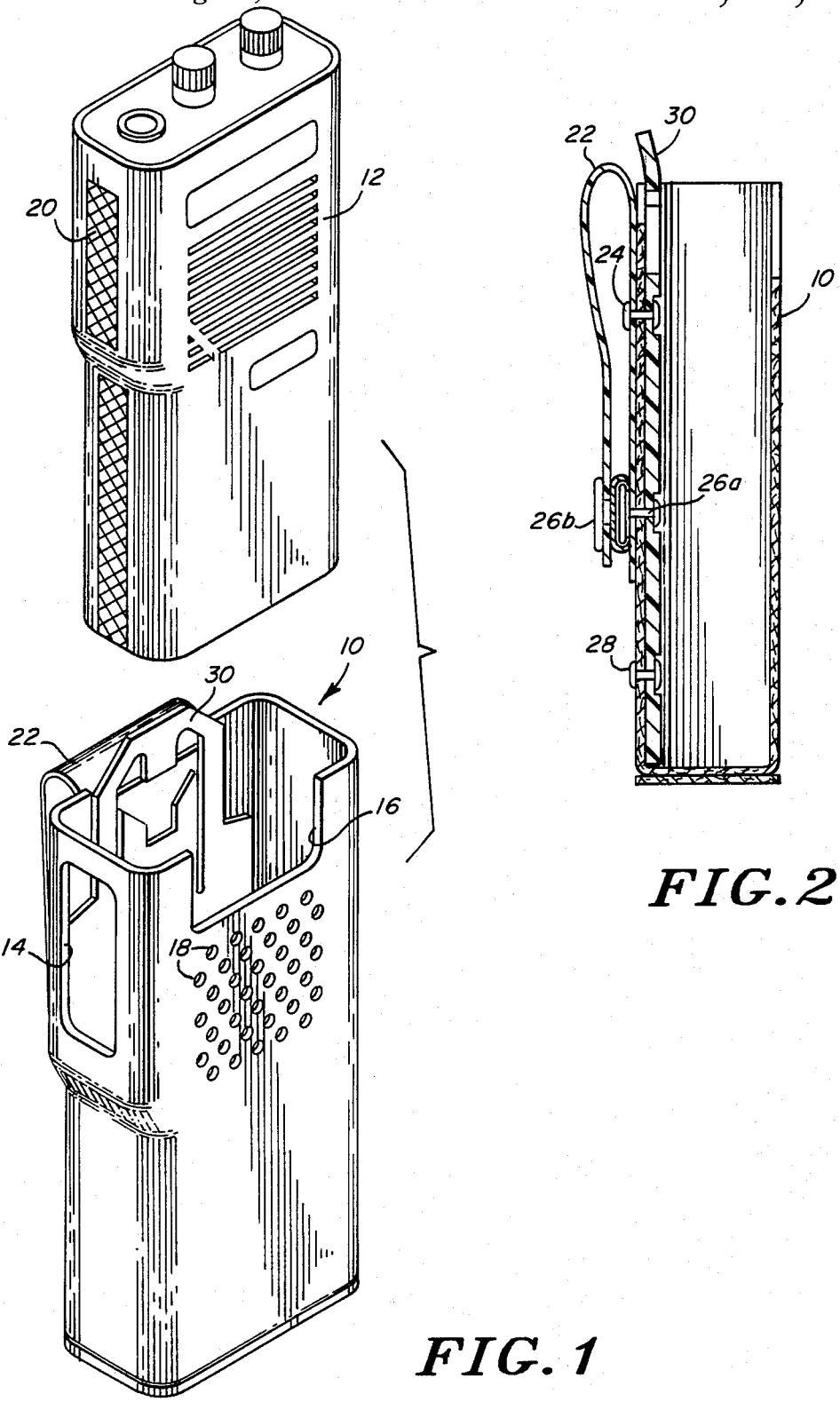
FIG. 1 is a view in perspective of the carry case constructed in accordance with the present invention together with a portable radio unit which the case will accommodate.
FIG. 2 is a cross-sectional view of the carry case of FIG. 1.

Referring now to the drawings, a carry case 10 and a portable radio unit 12, for accomodation therein, are shown in FIG. 1. Case 10 has been constructed in accordance with the present inventio. The case itself may be fabricated of a soft, resilient and shockabsorbent material, such as leather, soft plastic, or the like. Case 12 includes a rectangular cutout segment 14 in one side wall thereof, as shown. A further cutout 16 is included centrally of the top front wall. A series of apertures are openings 18 are included on the front wall below cutout 16. Openings 18 are intended to permit audio signals generated by the portable radio 12 to transverse to the open ambient so as to be heard by the radio user or others. The cutout 14 is intended to permit access to the push-to-talk switch 20 of the portable radio 12 when the latter is retained within carry case 10 and thereby enable operation of the transmitter portion of the radio unit so retained.

Carry case 10 also includes a flexible belt flap 22 attached to the backside of carry case 10 as shown in FIGS. 1 and 2. This is to permit mounting and retaining the carry case 10 on the belt of a user. Flap 22 may be permanently affixed to the back side of carry case 10 at the top thereof, such as by one or more rivets 24, best seen in FIG. 2. The lower end of the flap may be releasably attached to carry case 10 such as by one or more snap buttons 26. The base portion 26a thereof functions substantially as a rivet with the top or cover portion 26b releasably snap fitting on the base button 26a. Of course, it is to be understood that flap 22 may be retained or omitted as desired.

Figure 5:
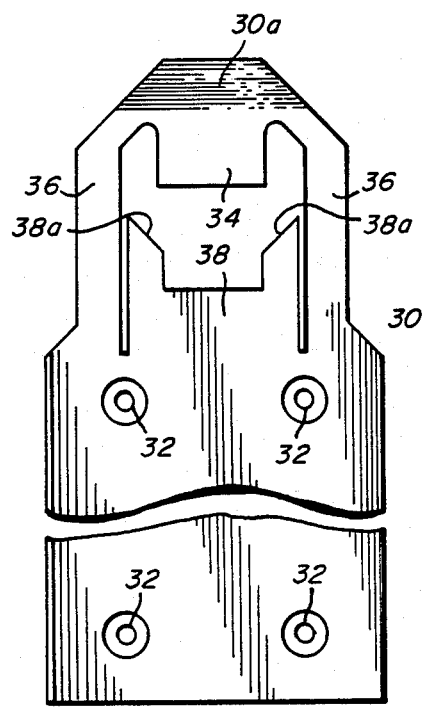
FIG. 5 is a plan partial view of the retainer bracket adaptable for attachment to the interior back wall of the carry case as shown in FIGS. 1 and 2.

Finally, carry case 10 also includes a retainer bracket 30 attached to the interior back wall of the case as indicated. Retainer bracket 30, best seen in FIGS. 2 and 5, may be affixed by any suitable means, such as by the previously referenced rivets 24 and 26a, utilized for flap 22, as well as additional rivets 28. Apertures 32 are provided in retainer bracket 30 for this purpose.

Bracket 30 may be constructed of any suitable semi-rigid material, such as thermol-plastic nylon canvas, or even thin metal, if desired. It must be rigid enough to latch in a fixed position so as to hold or retain the portable radio 12 in the leather case 10, but movable, i.e., flexible enough, or at least a portion thereof, to disengage as a latch and permit the radio to be removed at the option of the user. In the present case, the bracket was constructed from Zytel, a trademarked (General Electric Company) nylon powder, suitably molded to its finished form.

To this end, retainer bracket 30 includes a latch portion 30a in the form of a downwardly extending finger or tongue 34 attached at its top end to a U-shaped portion of the bracket having lateral arms 36 extending downwardly and attached to the body of the bracket itself. Latch portion 30a is made flexible and pivots about the point where arms 36 attach to the main body of bracket 30. Further, an additional tongue 38 extends upwardly from the body of bracket 30, as depicted. tongue 38 includes sloping side portions 38a, the purpose of which will become clear subsequently.

Figure 3:
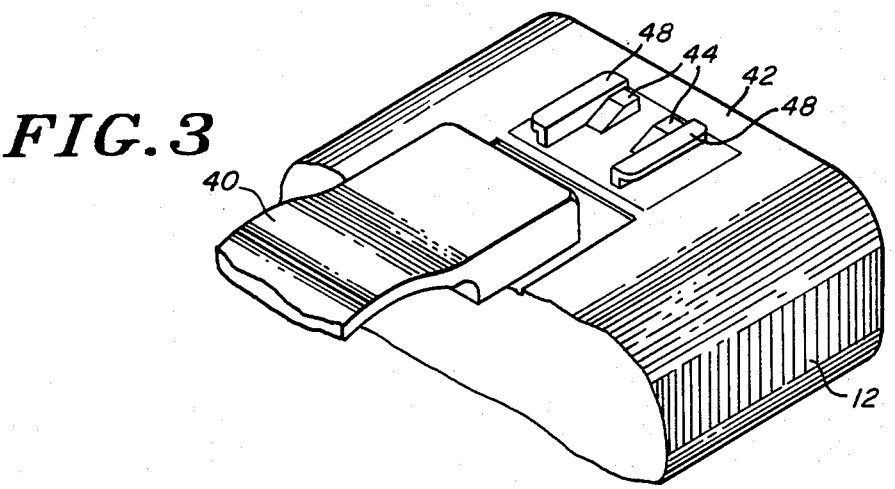
FIG. 3 is a fragmentary view in perspective of the portable radio of FIG. 1 with its associated mounting clip removed.
Figure 4:
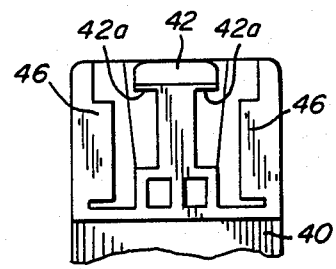
FIG. 4 is a fragmentary plan view of the rear of the portable radio mounting clip.

It is to be noted that the retainer bracket of the present invention contemplates latching to a feature of the associated hand held appliance, in this case, radio 12, on a surface other than the top so as to maintain the radio controls located thereon in a fully accessible condition. In the present application, radio unit 12 includes a mounting clip 40 on its rear surface 42. This mounting clip is designed to be removable at the option of the user, as shown in FIG. 3. The clip is removed by pressing the tongue member 42, best seen in FIG. 4, with a suitable tool to cause the top flanges 42a to clear the top surface of guide ramps 44. While holding flange 42a in this position, mounting clip 40 may simply be pulled down as side rails 46 slideably clear support bars 48 and the mounting clip 40 is free of restraint. Support bars 48 are undercut to form a top flange which overlies a portion of the respective side rails 46 and thereby captivates the clip 40 when in the fully mounted position.

With mounting clip 40 demounted, support bars 48 provide the feature to which retainer bracket 30 may effectively latch on to. The radio unit 12 need only be inserted into case 10 and pushed fully downward until it reaches the bottom of the case 10. Support bars 48 contact the upper surface of tongue member 38 and the latch portion 30a or more correctly tongue member 34, is biased to a position overlying the top of support bars 48. Radio unit 12 is thereby firmly and reliably latched within case 10. It will stay latched even if case 10 and radio unit 12 is positioned substantially off vertical, even upside down. The radio unit 12 is also completely operational within case 10 when so retained therein. Push-to-talk switch 20 is accessible through opening 14 and the controls on the top surface of radio 12 are fully accessible without obstruction.

Of course, radio unit 12 may be removed from case 10 before being operated, at the option of the radio user. To remove the radio unit 12, the user need only press on the top portion 30a of bracket 30 to move the tongue 34 to a position which clears the top surface of support bars 48. Simultaneously, the user will place the thumb on the radio surface within the cutout portion 16 of carry case so as to grasp radio 12 and remove the same from the case. Note that this is a quick release action requiring only the manipulation of the users hand to a position to grasp the top of the radio and remove it from the case. The radio unit 12 may be reinserted whenever desired and the radio will be immediately and automatically latched within case 10 upon its full insertion therein.

Figure 6:
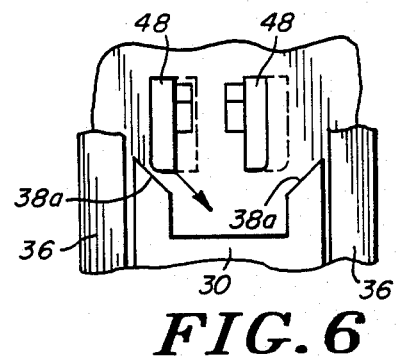
FIG. 6 is a partial and diagramic representation of the self locating feature of the retainer bracket on the back support bars of the portable radio.

One final feature of the present invention needs to be presented in further detail. This is the self-locating feature wherein the radio is automatically positioned within case 10 and latched by the retainer bracket 30 as previously described. This feature may be more readily appreciated by reference to FIG. 6. When the radio is inserted within the case, the support bars 48 may be off the precise center in the case and in that position, one of hte support bars 48 will contact one or the other of the sloping surfaces 38a such as depicted in solid line in FIG. 6. In this event, the sloping surface will cause the support bar 48 and in turn the radio unit 12 itself to shift position back to a more central location as depicted by the dotted line wherein the bottom of the two support bars 48 are precisely located on the flat horizontal portion of the tongue 38 and not on the sloping surfaces of either of the sloping sides 38a. This provides a convenient and reliable self-locating feature and is a significant aspect of the latching action regarding the retainer bracket 30.

Accordingly, what is claimed is:

1. A carry case for a portable hand held appliance wherein said appliance is provided with a feature thereon for affixing a mounting clip thereto, including in combination:
    on enclosed carry case being open at a top end for housing the portable appliance,
    a retainer bracket of semirigid material attached to the interior back wall of the case,
    said retainer bracket having self-locating means for centering the portable appliance clip mounting feature and latching means for retaining the portable appliance within said carry case,
    said retainer bracket having a top portion thereof extending upwardly from the carry case and moveable by a user's hand to force said latch means from engagement with said clip mounting feature and thereby serve as an automatic quick-release to permit removal of the appliance from the case; and
    flap means secured to the exterior of said case for supporting said case on the belt of the user.

2. A carry case in accordance with the claim 1 wherein said self-locating means includes inwardly sloping ramp members on said retainer bracket for contacting said clip mounting feature of the portable appliance and causing the same to be centrally positioned upon insertion of the portable appliance within the case.

3. A carry case in accordance with the claim 1 wherein said top portion of said retainer bracket is in the form of an inwardly curved flange member.

4. A carry case in accordance with the claim 1 wherein said carry case is formed of a soft, resilient, shock absorbing material.

5. A carry case in accordance with the claim 4 wherein said soft, resilient, shock absorbing material is leather.

6. A carry case in accordance with the claim 4 wherein said soft, resilient, shock absorbing material is nylon canvas.

7. A carry case in accordance with the claim 1 wherein said semirigid material from which said retainer bracket is formed comprises molded Zytel thermoplastic.

* * * * *

UNITED STATES PATENT AND TRADEMARK OFFICE
CERTIFICATE OF CORRECTION

PATENT NO. : 4,858,798

DATED : August 22, 1989

INVENTOR(S) : Siddoway, et al

It is certified that error appears in the above-identified patent and that said Letters Patent is hereby corrected as shown below:

```
Column 4, Claim 1, line 28, delete "on" and insert
--an--;
                      line 31, delete "the", first
occurrence, and insert --an--.
```

Signed and Sealed this

Twenty-fourth Day of July, 1990

Attest:

HARRY F. MANBECK, JR.

*Attesting Officer*       *Commissioner of Patents and Trademarks*